United States Patent
Ota (10) Patent No.: US 7,543,797 B2
(45) Date of Patent: Jun. 9, 2009

(54) VALVE DEVICE

(76) Inventor: Mitsuhiko Ota, 1-141-425 Koyocyounaka 1-chome, Higashinada-Ku, Kobe-Shi, Hyogo 658-0032 (JP)

( * ) Notice: Subject to any disclaimer, the term of this patent is extended or adjusted under 35 U.S.C. 154(b) by 126 days.

(21) Appl. No.: 11/910,209

(22) PCT Filed: Apr. 3, 2006

(86) PCT No.: PCT/JP2006/307514

§ 371 (c)(1),
(2), (4) Date: Sep. 28, 2007

(87) PCT Pub. No.: WO2006/117978

PCT Pub. Date: Nov. 9, 2006

(65) Prior Publication Data

US 2009/0072178 A1 Mar. 19, 2009

(30) Foreign Application Priority Data

Apr. 28, 2005 (JP) ............................. 2005-160419

(51) Int. Cl.
*F16K 31/44* (2006.01)

(52) U.S. Cl. .................. 251/199; 251/204; 251/302; 251/248

(58) Field of Classification Search ............... 251/248, 251/301–302, 203–204, 195, 199
See application file for complete search history.

(56) References Cited

U.S. PATENT DOCUMENTS

| 88,934 | A | * | 4/1869 | Wilson | 251/195 |
|---|---|---|---|---|---|
| 284,122 | A | * | 8/1883 | Dover | 251/195 |
| 450,588 | A | * | 4/1891 | Lunkenhiemer | 251/302 |
| 1,421,687 | A | * | 7/1922 | Haynes | 251/176 |
| 1,574,959 | A | * | 3/1926 | Dearing | 251/75 |
| 2,272,110 | A | * | 2/1942 | Childress | 60/475 |
| 2,611,575 | A | * | 9/1952 | Webb | 251/302 |
| 2,895,709 | A | * | 7/1959 | Frieda | 251/167 |
| 3,325,141 | A | * | 6/1967 | Skendrovic | 251/302 |
| 5,284,320 | A | * | 2/1994 | Michael et al. | 251/304 |

FOREIGN PATENT DOCUMENTS

| JP | 28-11083 | 11/1953 |
|---|---|---|
| JP | 54-153325 | 12/1979 |
| JP | 56-76773 | 6/1981 |
| JP | 61-059435 | 3/1986 |
| JP | 61-59435 | 12/1986 |
| JP | 63-046309 | 2/1988 |
| JP | 2005-160419 | 4/2005 |

* cited by examiner

*Primary Examiner*—John Rivell
*Assistant Examiner*—Marina Tietjen
(74) *Attorney, Agent, or Firm*—J.C. Patents (57) ABSTRACT

A valve device is provided. The valve device of the present invention includes a planetary component and two valve plates. The two valve plates are disposed on a hole portion of the planetary component opposite to each other, so as to provide a quick opening and closing with a relatively high opening and closing speed, and to reduce the space occupied. Therefore, the provided valve device does not need to perform adjustment (processing) to reduce the operating force on the sluice valve or to assure the closing function of the valve. Further, the function and the producibility of the valve are improved significantly.

6 Claims, 6 Drawing Sheets

VALVE DEVICE

CROSS-REFERENCE TO RELATED APPLICATION

This application claims the priority benefit of PCT application serial no. PCT/JP2006/307514, filed Apr. 3, 2006, and which claims Japanese patent application no. 2005-160419, filed Apr. 28, 2005. The entirety of each of the above-mentioned patent applications is incorporated herein by reference and made a part of this specification.

BACKGROUND OF THE INVENTION

1. Field of the Invention

The present invention relates to a valve device using a planetary component for opening and closing a valve plate.

2. Description of Related Art

Figure 1:
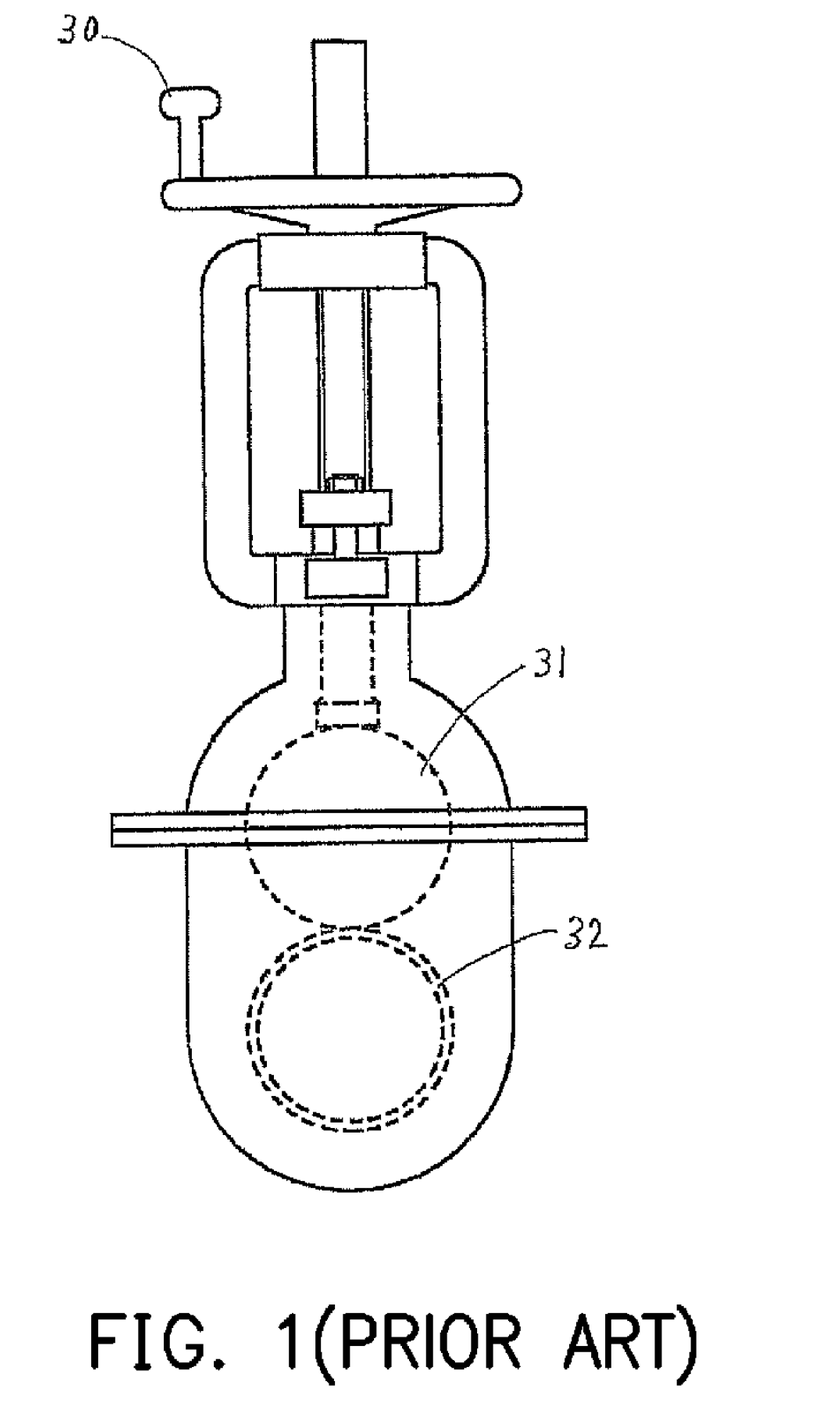
FIG. 1 is a structural diagram of a current sluice valve.

As an embedded valve device embedding valve plates between opposite valve seats, a sluice valve is known to the prior art (referring to FIG. 1 of Patent Reference 1). However, in order to open and close a valve, it is necessary to turn a handle 30. Hence, a relatively long time is required for the opening and the closing of the valve. In addition, the height of the valve is relatively large, and a relatively great thrust is required to open and to close the valve. Further, in order to ensure that the valve plate 31 is closed, it is necessary to perform an adjustment (processing), so as to assure the tight sealing of the seal faces of the valve plates 31 and the valve seats 32.

In view of the problems that the time for the opening and closing of the valve becomes longer and the height of the valve device becomes larger, a following method is considered, in which a planetary gear is used in constituting the valve plates to solve the problems (Patent Reference 2 and Patent Reference 3).

[Patent Reference 1] Japanese Patent Utility Model Publication No. JP 56-76773U, the current Gazette of the sluice valve

[Patent Reference 2] Japanese Patent Publication No. JP 61-59435B Gazette

[Patent Reference 3] Japanese Patent Publication No. JP 63-46309B Gazette

However, the valve plates are in sliding contact with the guide portions of the valve plates when the planetary gear is used in constituting the valve plate. Further, due to the tolerances or mutual friction of the teeth of the planetary gear, the sun gear, and the internal gear, the degree of freedom of the valve plate becomes limited. Therefore, the valve function of closing the valve plates and the valve seats, i.e. the closing capability, is inadequate.

In addition, the following aspects still require improvement. The seal faces of the valve seats are in sliding contact with the moving valve plates, such that the seal faces are damaged, inducing an adverse effect on the closing function of the valve.

In another aspect, when the planetary gear is used in constituting the valve plates, the following problem is still unsolved. That is, it is necessary to reduce the current operating force on the sluice valve; or in order to assure the closing function of the valve, it is necessary to perform the adjustment (processing).

SUMMARY OF THE INVENTION

In order to solve the above problems, in the valve device of the present invention, valve plates are inserted between a pair of valve seats that are disposed in a flow path and are opposite to each other, or the valve plates are removed so as to open or to close the flow path. The valve device is characterized by including an arc-shaped internal gear formed in a frame body of the valve device; a sun gear disposed on a center of the arc-shaped internal gear; a driving shaft connected on the sun gear; a planetary component engaged with the internal gear and the sun gear; and a pair of valve plates disposed on both sides of the planetary component. Further, a central portion of the valve plate is embedded in the planetary component in a manner that the central portion of the valve plate is capable of rolling freely. By turning of the driving shaft, the pair of the valve plates is inserted between the valve seats or is detached from the valve seats for constituting an opening and closing the flow path. In such an opening and closing assembly, protrusion portions are disposed on the centers of inner sides of seal faces of the pair of the valve plates. In another aspect, an inner diameter side of the planetary component is in rolling contact with the protrusion portions of the valve plates, such that a turning driving force of the planetary component used as a tightening force of the valve plates is transmitted to the pair of valve seats. Ultimately, the pair of valve plates moves towards the pair of valve seats, and seal faces of the valve seats tilt towards the moving direction of the valve plates.

Also, the present invention is characterized by configuring the protrusion portions of the valve plates opposite to the inner diameter side of the planetary component, and by providing the inner periphery of the planetary component be taper surfaces or curved surfaces, such that the valve plate is embedded in a hole portion of the planetary component in a manner that the valve plate swings freely.

Further, the present invention is characterized by disposing guide members supporting outer peripheries of the valve plates on the driving shaft in a manner that the guide members supporting outer peripheries of the valve plates spin freely, so as to prevent sides of the sun gear of the pair of valve plates from separating.

In addition, the present invention is characterized by providing the contact portions of the guide members and the inner face of the frame body be taper surfaces or curved surfaces, and by providing the outer peripheries of the valve plates be curved surfaces or taper surfaces, so as to allow the contact portions and the outer peripheries of the valve plates be in point contact.

Also, the present invention is characterized by forming guide portions on the inner peripheries of the valve seats. When the valve plates are moved towards a direction to block the flow path, the guide portions guide the outer peripheries of the valve plates. Further, the section of the guide portions has an arc shape.

In addition, the present invention is characterized by using components with low friction to constitute the outer peripheries of the valve plates and end surfaces of the inner diameters of the valve seats, and to promote the outer peripheries of the valve plates in slidable contact with the end surfaces of the inner diameters of the valve seats. Hence, the contact portions of the outer peripheries of the valve plates and the end surfaces of the inner diameters of the valve seats are protected.

In order to achieve the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 2:
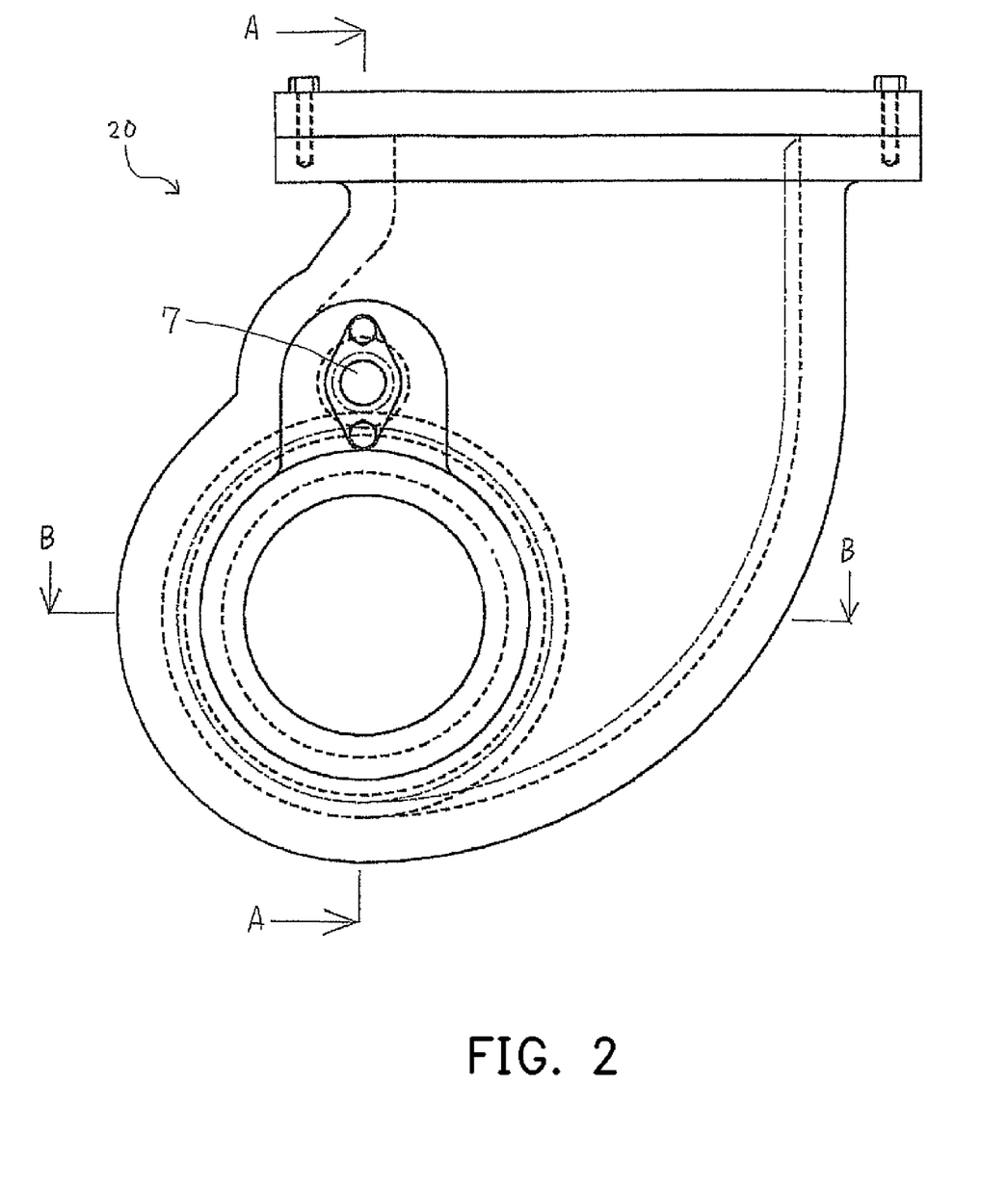
FIG. 2 is an exterior view of a valve device according to an embodiment of the present invention, and the closed state of the valve is illustrated.
Figure 3:
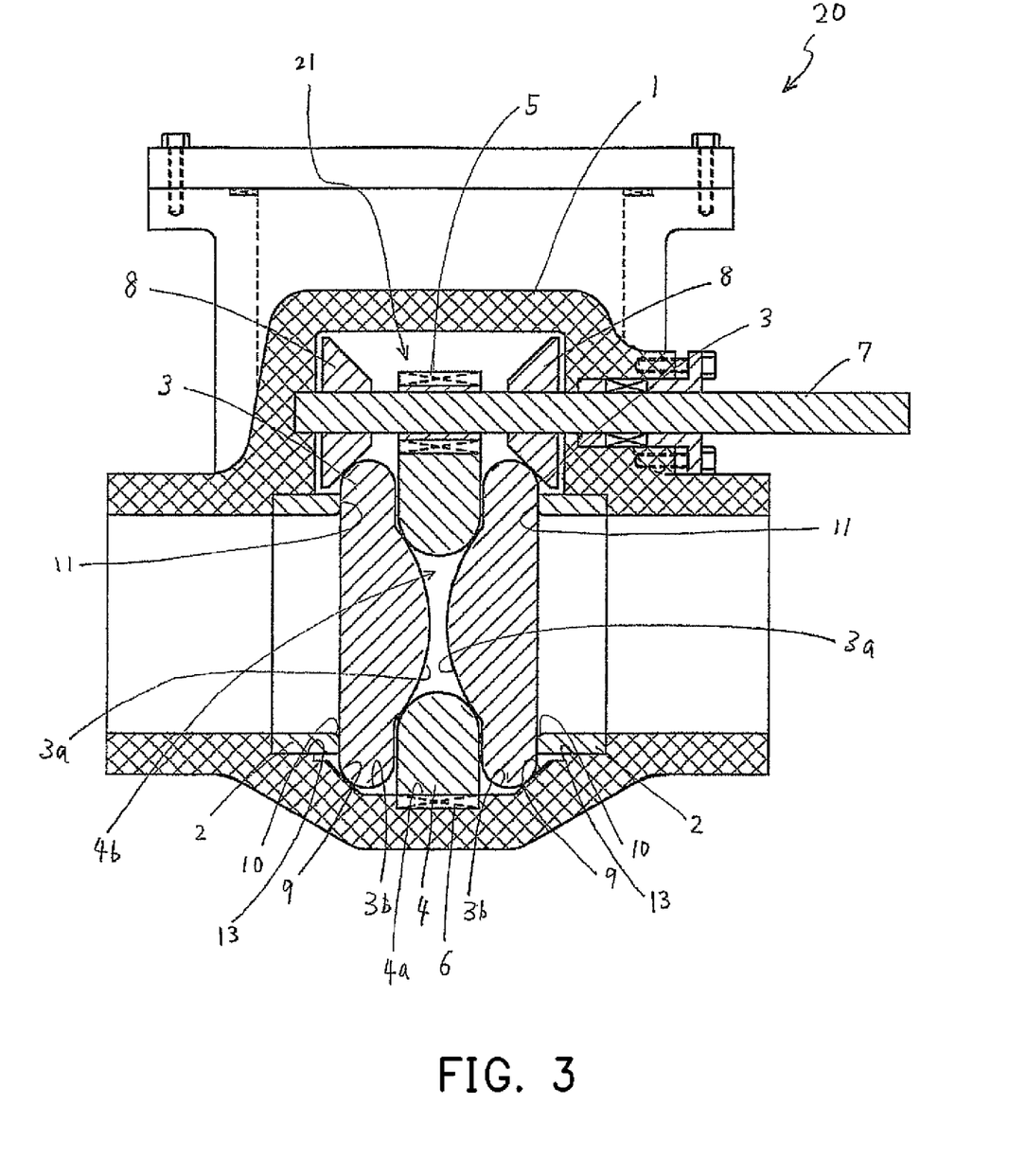
FIG. 3 shows a section view of FIG. 2, along the line A-A.
Figure 4:
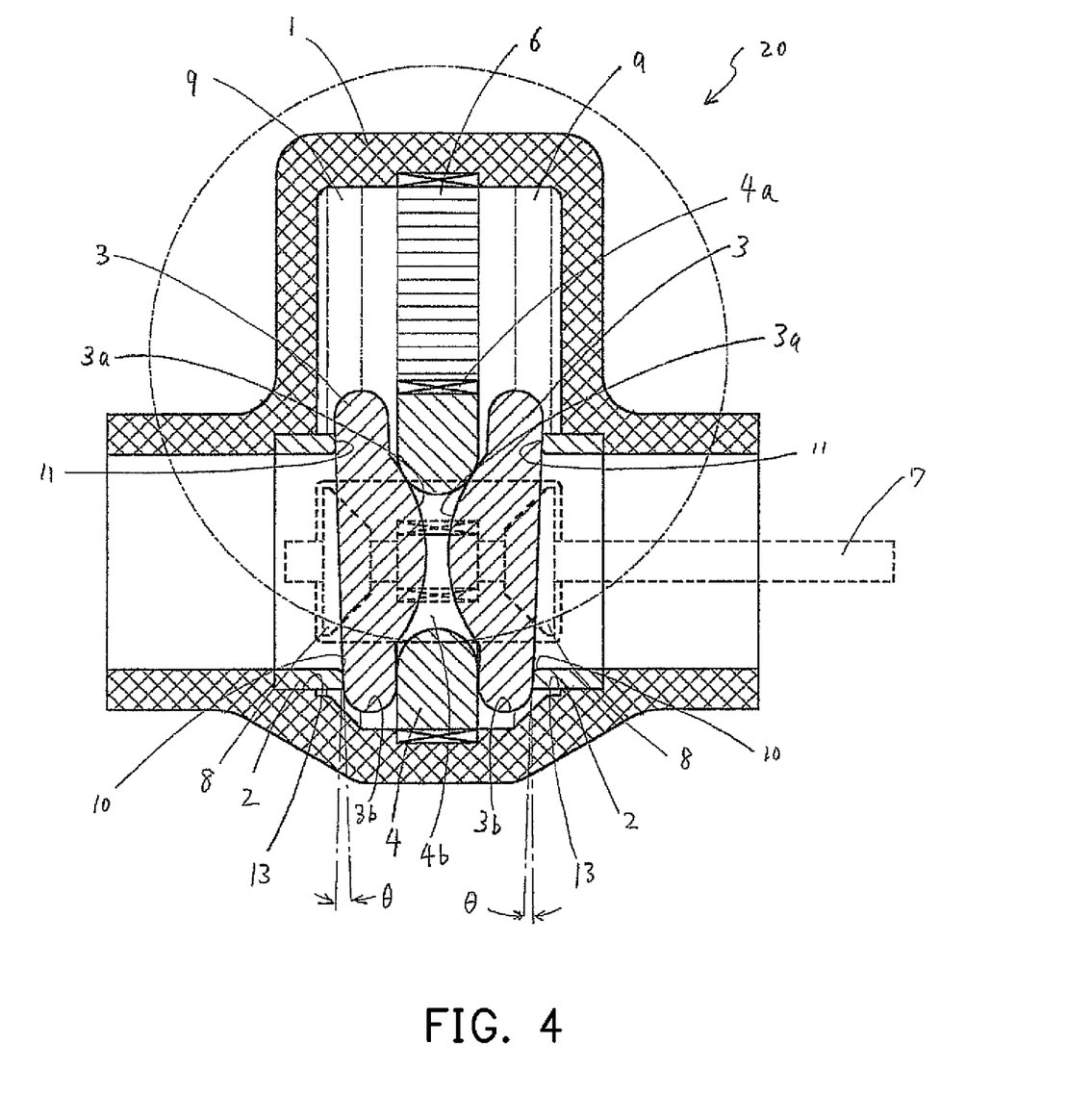
FIG. 4 shows a section view of FIG. 2, along the line B-B.
Figure 5:
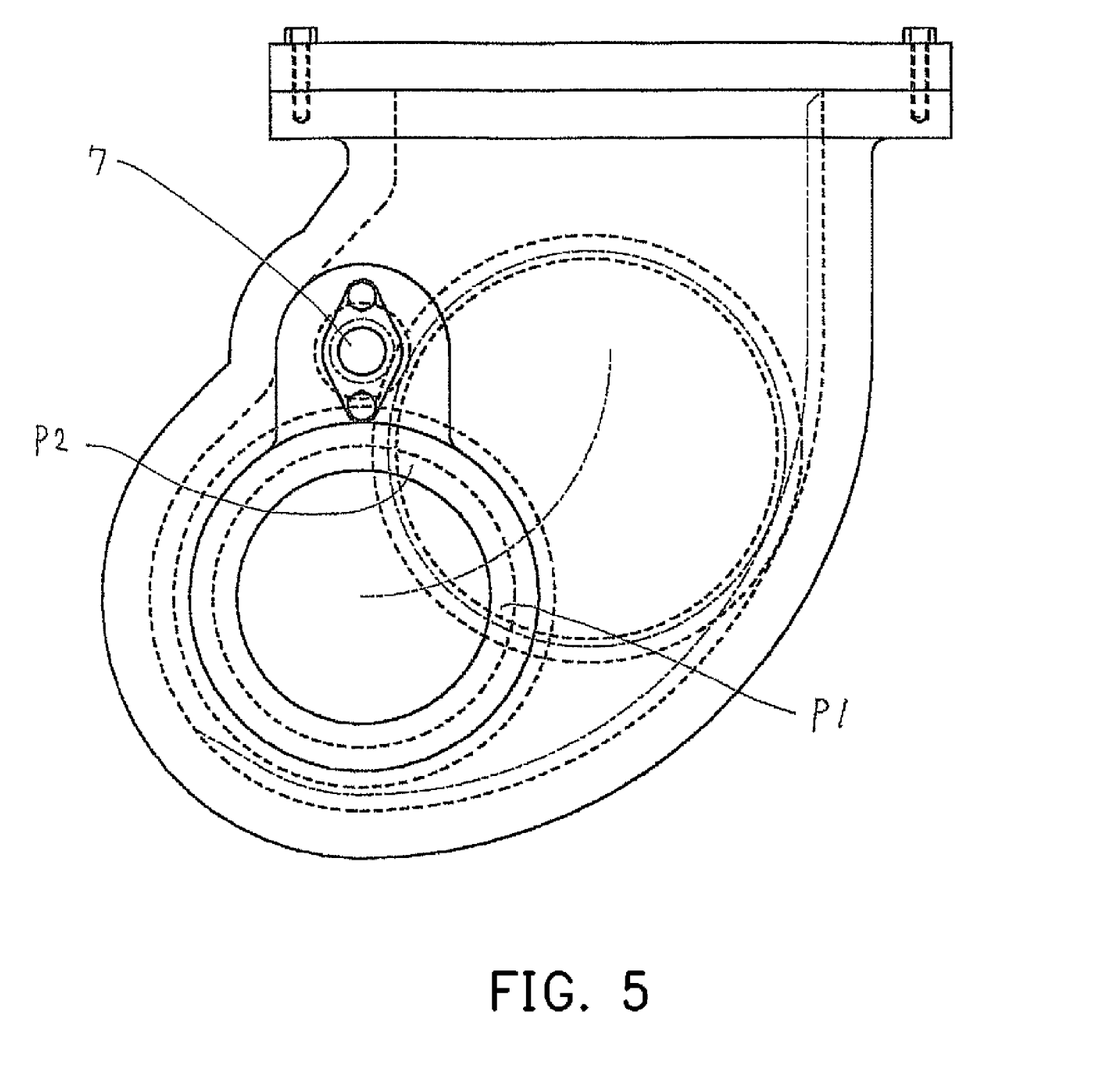
FIG. 5 shows the opening and closing states of a valve in FIG. 2.
Figure 6:
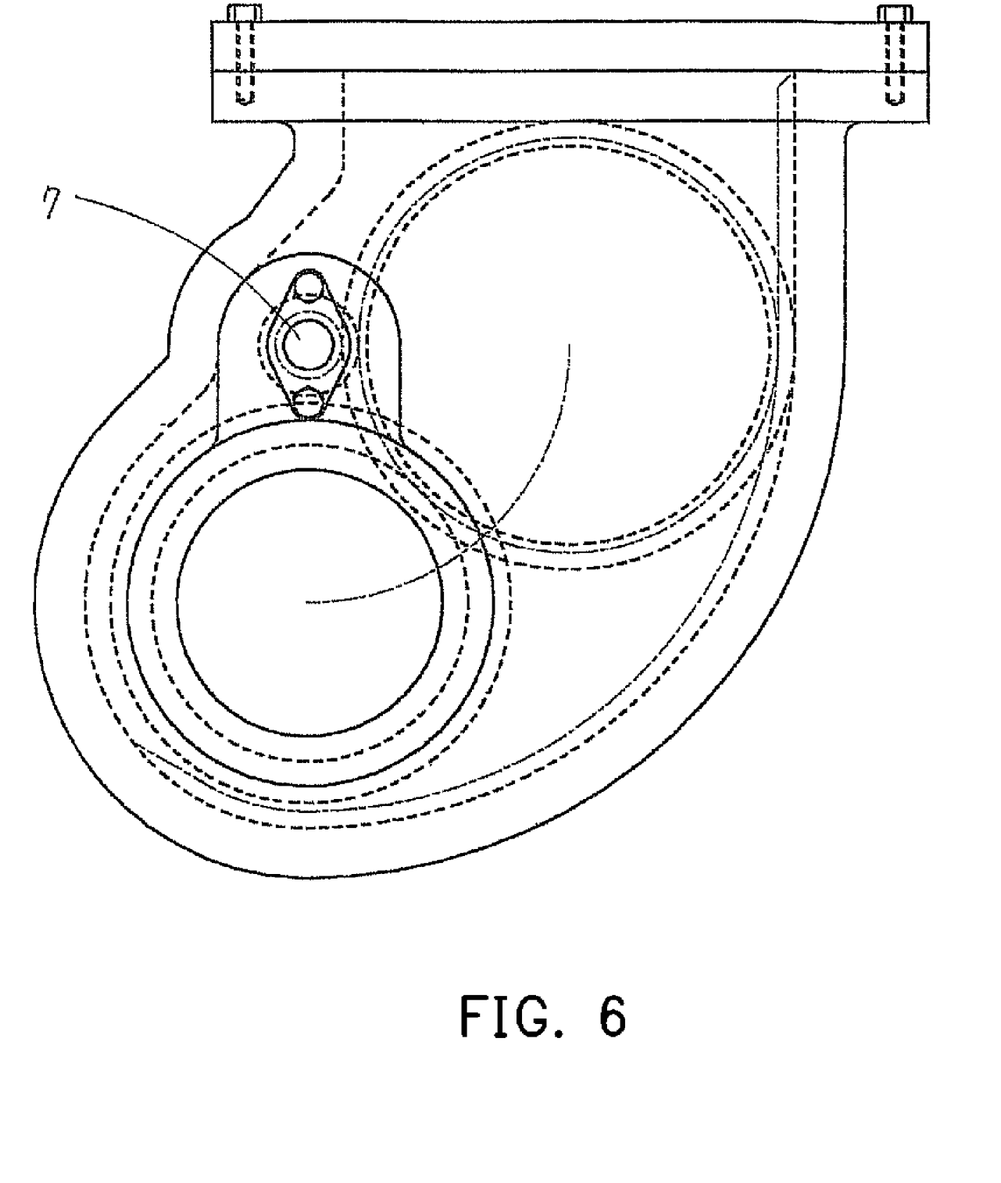
FIG. 6 shows the completely open state of the valve in FIG. 2.

In order to describe the present invention in detail, the illustration is provided with reference to the accompanying drawings. FIG. 2 is an exterior view of a valve device 20 according to an embodiment of the present invention, and the closed state of the valve is illustrated. FIG. 3 shows a section view of FIG. 2, along the line A-A. FIG. 4 shows a section view of FIG. 2, along the line B-B. FIG. 5 shows the opening and closing state of a valve in FIG. 2. FIG. 6 shows the completely open state of the valve in FIG. 2. FIG. 3 is used to illustrate the construction of the valve.

A planetary mechanism 21 and valve plates 3 and 3 are accommodated in a frame body 1. The planetary mechanism 21 is composed with a sun gear 5 and a planetary component 4. A cavity is formed in the frame body 1, so as to provide an area for the opening and closing motion tracks of the planetary component 4 and for disposing components, such as the sun gear 5, that are used to drive the valve to perform the opening and closing motions in the cavity. Two opening portions, used as pipe end portions and connected to pipe components, are formed on the left and right sides of the valve device 20. In the frame body 1, an internal gear 6 constituting a part of the planetary gear mechanism is formed, and the internal gear 6 regulates an area for revolution motion track of the planetary component 4. Two opposite guide pieces 9 and 9 are formed in the frame body 1 at two positions. The guide pieces 9 have taper surfaces, and the guide pieces 9 constitute the guide faces when the valve plates 3 on the two sides of the planetary component 4 perform the revolution motion of opening and closing. At the position connecting to the pipe component connected to the frame body 1 of the valve device 20, a pair of shoulders 13 is disposed on the left and the right sides. Ring shaped valve seats 2 pass through the shoulders 13. As shown in FIG. 4, closing faces 11 of the valve seats 2 tilted by an angle θ are formed along the direction of the revolution motion of the valve plates 3. Curved protrusions 3a are disposed on the centers of the inner sides of the seal faces of two valve plates 3. Also, outer periphery portions 3b of the valve plates 3 are curved surfaces. A planetary gear 4a is formed on the periphery of the planetary component 4, and the inner diameter surface of the hole portion 4b of the planetary component 4 is a curved surface. A sun gear 5 is connected with a driving shaft 7 to form an integrated component. The driving shaft 7 is connected to a handle or a turning driving device which is not shown in the figure, and is used as an external operating portion of the valve to transmit the turning motion of the handle or the turning driving device to the sun gear 5. Two guide members 8, disposed on two positions of a shaft same as the driving shaft 7 in a manner that the two guide members 8 spin freely and guide two independent valve plates 3 during the opening and the closing of the valve. The two independent valve plates 3 approximately and synchronously roll with the rotation motion of the planetary component 4 to perform the revolution motion. The contacting faces of the guide members 8 and the outer periphery portions of the valve plates 3 are taper surfaces. The guide pieces 9 carries out the guidance for the valve plates 3 and the planetary component 4 performing the revolution motion move towards the valve seats 2 together, during the opening and the closing of the valve. Two guide pieces 9 are formed neighboring the area for the revolution motion track of the planetary component 4 in the frame body 1. The guide faces of the guide pieces 9 are taper surfaces. During the opening and closing of the valve, the outer periphery portions 3b of the valve plates 3 are in rolling contact with the guide members 8 and the guide pieces 9, such that the valve plates 3 can smoothly move during the opening and the closing of the valve. Also, during the rolling motion of the valve plates 3, the outer periphery portions 3b of the valve plates 3 are in sliding contact with the end surfaces 10 of the inner diameters of the valve seats 2. Concurrently, the outer periphery portions 3b of the valve plates 3 enter into the inner diameters of the valve seats 2. In order not to obstruct the opening and closing motions of the valve plates 3 because the outer periphery portions 3b are pressed toward the inner diameter parts of the valve seats 2, the outer periphery portions 3b of the valve plates 3 are provided as curved surfaces. More desirably, the outer periphery portions 3b of the valve plates 3 have the following surface layers, and a surface treatment for reducing friction is performed on the surface layers. In this manner, the opening and closing motions of the valve plates 3 become smooth. When the valve plates 3 perform the rolling motion, the outer periphery portions 3b of the valve plates 3 are in sliding contact with the end surfaces 10 of the inner diameters of the valve seats 2. Concurrently, the outer periphery portions 3b of the valves plates 3 enter into the inner diameters of the valve seats 2. Instantly, in order not to obstruct the opening and closing motions of the valve plates 3 due to the compression on the inner diameter parts of the valve seats 2 by the outer periphery portions 3b of the valve plates 3, the end surfaces 10 of the inner diameters of the valve seats 2 are provided as curved surfaces relative to the flow path center. More desirably, the end surfaces 10 of the inner diameters of the valve seats 2 have the following surface layers, and a surface treatment for reducing friction is performed on the surface layer. In this manner, the opening and closing motions of the valve plates 3 become smooth.

In the followings, the actuation of the valve device of the present invention is illustrated according to FIG. 3.

The sun gear 5, the planetary component 4, and the internal gear 6 form the planetary gear mechanism. After the handle or the external driving device connected to the driving shaft 7 is driven, causing the driving shaft 7 to turn, the sun gear 5 is turned, and the planetary component 4 engaged with the sun gear 5 is turned and starts to rotate.

Also, the planetary component 4 is engaged with the internal gear 6, so the planetary component 4 revolves in an arc manner along the internal gear 6. The protrusion portions 3a of the valve plates 3 are disposed in the inner diameter of the hole of the planetary component 4. On the guide pieces 9 or the guide members 8, and the inner diameter face of the hole portion 4b of the planetary component 4, the motion of the valve plates 3 is limited, so the valve plates 3 move with the revolution motion of the planetary component 4 towards the direction of the valve seats 2.

The valve plates 3, which are in rolling contact with the guide pieces 9 and the guide members 8, move with the revolution motion of the planetary component 4 towards the direction of the valve seats 2. However, the valve plates 3 rotate together with the rotation motion of the planetary component 4. The valve plates 3 are in rolling contact with the guide pieces 9. Further, the valve plates 3 are also in rolling contact with the guide members 8, wherein the guide members 8 is disposed on the driving shaft 7 and spin freely, to greatly reduce the friction, which obstruct the valve plates 3 from moving, between the valve plates 3 and the guide pieces 9 and the guide members 8.

As the valve plates 3 approach the valve seats 2, the dynamic pressure generated due to the flowing of the fluid pushes the valve plates 3 to the exit side of the valve seats 2. Instantly, in the above-mentioned revolution motion, the outer peripheries 3b of the valve plates 3 enter into the inner diameters of the valve seats 2, and the outer peripheries 3b of the valve plates 3 contact with the end surfaces 10 of the inner diameters of the valve seats 2. However, as shown in FIG. 5, at the contact portions P1 and P2 corresponding to the end surfaces 10 of the inner diameters of the valve seats 2, the contact portion P1 of the outer side is in rolling contact because of the tendency of the rotation motion of the valve plates 3. The other contact portion P2 is in sliding contact, but the outer peripheries 3b of the valve plates 3 and the end surfaces 10 of the inner diameters of the valve seats 2 are curved surfaces. Therefore, the sliding contact is relatively smooth, and a relatively small driving force is required for the valve plates 3 to successively perform the opening and the closing motions.

In addition, the outer peripheries 3b of the valve plates 3 are also provided as curved surfaces in a manner opposite to the end surfaces 10 of the inner diameters of the valve seats 2, wherein the valve seats 2 form the curved surface relative to the center of the flow path. Also, in order to protect the contact portions, the end surfaces 10 of the inner diameters of the valve seats 2 are provided to have the surface layers with relatively low friction, such that the outer peripheries 3b of the valve plates 3 are in sliding contact with the curved surfaces of the end surfaces 10 of the inner diameters of the valve seats 2.

With the revolution motion of the planetary component 4, the valve plates 3 move towards the direction of closing the valve seats 2. After the downstream side valve plates 3 reach the position for blocking the entire inner diameter of the valve seats 2 disposed at the exit side, in the outer peripheries 3b of the valve plates 3, the moving direction portion of the valve plates 3 leaves the end surfaces 10 of the inner diameters of the valve seats 2, and the seal faces of the valve plates 3 and the seal faces of the valve seats 2 become in agreement. Instantly, the valve plates 3 at the downstream side rotate along the seal face of the tilted valve seats 2, and the valve plates 3 slide.

Next, the planetary component 4 and the two valve plates 3 reach the seal faces of the valve seats 2. The combination of the two valve plates 3 and the planetary component 4 moves till the position held by the two valve seats 2 to complete the closing motion of the valve. Under such a condition, the two valve plates 3 generate a closing force of the valve at the seal faces of the opposite valve seats 2 through the planetary component 4, so as to fully prevent the fluid from flowing.

In the above disclosure, the closing motion of the valve is illustrated. Since the motion that the valve changes from a closing state to an opening state is a reverse of the closing motion of the valve, detail description thereof will not be reiterated herein.

In the above description, one embodiment of the present invention is illustrated. However it is to be understood that the embodiment is presented by way of example and not by way of limitation. The above description is intended to cover all modification, alternatives and equivalents of the invention. For example, the planetary component 4 is not limited to be ring shape, even if the both positions of the central portion of the planetary component 4 are the indented portions, the planetary component 4 can still function normally.

INDUSTRIAL APPLICABILITY

As described above, the present invention provides the valve device as follows. During the opening and closing motions of the valve, the valve plate having degrees of freedom can effectively demonstrate the degrees of freedom by the rolling motion. In this manner, the seal faces of the valve plates can easily follow the seal faces of the two opposite valve seats, and are tightly seal with the seal faces of the two valve seats. Therefore, the closing function of the valve is greatly improved, the adjustment process is reduced, and the manufacturing is more cost-effective because of the relatively large degrees of freedom. In another aspect, the thrust required by the valve plates is transmitted from the driving gear and through the planetary component. As a result, the driving force applied on the driving shaft is one half of the thrust required for the opening and closing of the valve under leverage effect. Further, the rolling motion of the valve plates can reduce the friction loss of driving transmitting force. Hence, the operating force for the opening and the close of the valve is reduced. Further, the opening and the closing speeds are relatively high to achieve quick opening and closing, and the space occupied is reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A valve device, wherein valve plates are inserted between or detached from a pair of valve seats opposite to each other disposed in a flow path to open or to close the flow path, the valve device comprising:

an arc shaped internal gear, formed in a frame body of the valve device;

a sun gear, disposed on a center of the arc shaped internal gear;

a driving shaft, connecting on the sun gear, wherein the driving shaft is capable of turning freely;

a planetary component, engaged with the internal gear and the sun gear; and a pair of valve plates, disposed on both sides of the planetary component, wherein a central portion of the valve plate is embedded in the planetary component in a manner that the central portion of the valve plate spins freely, wherein by turning of the driving shaft forward and backward, the pair of the valve plates is inserted between the valve seats or detached from the valve seats to constitute an opening and a closing assembly of the flow path;

a protrusion portion of the valve plates is disposed on a center of an inner side of a seal face of the pair of the valve plates in the assembly, and an inner diameter side of the planetary component is in rolling contact with the protrusion portion of the valve plates, such that a turning driving force of the planetary component, used as a tightening force of the valve plates, is transmitted to the pair of valve seats, and the pair of valve plates moves towards the pair of valve seats, and the valve seats tilt towards a moving direction of the valve plates.

2. The valve device as claimed in claim 1, wherein:

the protrusion portion of the valve plates opposite to the inner diameter side of the planetary component, and an inner periphery of the planetary component are provided as taper surfaces or curved surfaces, such that the valve plates are embedded into a hole portion of the planetary component in a manner that the valve plates swing freely.

3. The valve device as claimed in claim 1, wherein:

guide members supporting outer peripheries of the valve plates are disposed on the driving shaft in a manner that the guide members supporting outer peripheries of the valve plates spin freely to prevent sides of the sun gear of the pair of valve plates from separating.

4. The valve device as claimed in claim 1, wherein:

contact portions of the guide members toward the outer peripheries of the valve plates and contact portions of the inner face of the frame body are provided as taper surfaces or curved surfaces, and outer peripheries of the valve plates are provided as curved surfaces or taper surfaces for the contact portions be in point contact with the outer peripheries of the valve plates.

5. The valve device as claimed in claim 1, wherein:

guide portions are formed on inner peripheries of the valve seats, when the valve plates are moved towards a direction to block a flow path, the guide portions guide the outer peripheries of the valve plates, and sections of the guide portions are arc shape.

6. The valve device as claimed in claim 5, wherein:

components with low friction are used to form the guide portions having the arc shape sections and disposed on the inner peripheries of the valve seats and the outer peripheries of the valve plates.

* * * * *